United States Patent [19]

Taniguchi et al.

[11] 4,219,457
[45] Aug. 26, 1980

[54] RESINOUS COMPOSITION FOR SURFACE-TREATING REINFORCING FIBERS AND SURFACE-TREATING PROCESS

[75] Inventors: Itsuki Taniguchi; Ryuichi Itoh, both of Kyoto; Toshihiro Iwatsuki, Nagaokakyo; Shigehiro Ohuchi, Iyo, all of Japan

[73] Assignee: Toray Industries, Inc., Japan

[21] Appl. No.: 26,896

[22] Filed: Apr. 4, 1979

Related U.S. Application Data

[62] Division of Ser. No. 843,336, Oct. 18, 1977, Pat. No. 4,167,538.

[30] Foreign Application Priority Data

Oct. 19, 1976 [JP] Japan .................. 51-124487

[51] Int. Cl.$^2$ .................................. C08K 9/04
[52] U.S. Cl. ......................... 260/38; 260/37 EP; 260/40 R; 428/367
[58] Field of Search .............. 260/38, 37 EP, 40 R; 525/438; 428/367, 375

[56] References Cited

U.S. PATENT DOCUMENTS

| | | | |
|---|---|---|---|
| 3,297,782 | 1/1967 | Barkis et al. | 260/28 |
| 3,524,902 | 8/1970 | Feltzin et al. | |
| 3,837,904 | 9/1974 | Hill | 428/378 X |
| 3,964,952 | 6/1976 | Brie' et al. | 428/367 X |
| 4,107,128 | 8/1978 | Hosoi et al. | 428/367 X |

*Primary Examiner*—Sandra M. Person
*Attorney, Agent, or Firm*—Finnegan, Henderson, Farabow, Garrett & Dunner

[57] ABSTRACT

Disclosed are reinforcing fibers, particularly carbon fibers, used for the manufacture of a reinforced plastic composite material which are surface-treated with a resinous composition comprising (A) epoxy resin, (B) condensation product of an acid component comprising unsaturated dibasic acid and a hydroxyl component comprising oxyalkylated bisphenol, and (C) oxyalkylene derivative of phenol. The resinous composition has good dispersibility in water, and the reinforcing fibers surface-treated therewith exhibit improved adhesion to various resin matrixes.

8 Claims, No Drawings

RESINOUS COMPOSITION FOR SURFACE-TREATING REINFORCING FIBERS AND SURFACE-TREATING PROCESS

This is a division of application Ser. No. 843,336, filed 10/18/1977, now U.S. Pat. No. 4,167,538.

Reinforcing fibers are generally surface-treated with various treating agents for the purpose of enhancing their adhesion to resin or rubber matrixes. Suitable treating agents depend upon the particular reinforcing fiber and the particular resin or rubber matrix.

Particularly, carbon fibers possess good mechanical properties and are widely used for reinforcing thermosetting resins such as epoxy resins, unsaturated polyester resins, phenol resins and polyimide resins; thermoplastic resins such as polyamide resins, polyacetal resins, linear polyester resins, polycarbonate resins and polyolefin resins; polyurethane resins and the like. The adhesion of carbon fibers to the above-mentioned resin mixtures greatly varies depending upon the particular resin matrix used and, therefore, a surface treating agent must be suitably chosen depending upon the particular resin matrix.

Carbon reinforcing fibers in the form of filaments or a tow are usually pre-treated with a sizing agent such as an aqueous polyvinyl alcohol solution in order to prevent the filaments or tow from fluffing in the course of manufacturing composite materials therefrom, and to make it easy to handle the filaments or tow. However, a sizing agent such as polyvinyl alcohol lessens the adhesion between the carbon fibers and the resin matrix, and hence, must be substantially removed from the carbon fibers prior to the surface treatment of the carbon fibers. These sizing and desizing operations are troublesome.

Furthermore, most conventional surface treating agents are poor in dispersibility in water and, hence, must be used in the form of a solution in an organic solvent. The use of an organic solvent is not preferable from the standpoints of hygiene and safety.

An object of the present invention is to provide a resinous composition for use in surface-treating reinforcing fibers in order to enhance the adhesion of the reinforcing fibers to resin matrixes. Particularly, when the resinous composition is used for surface-treating reinforcing carbon fibers, the resulting surface-treated carbon fibers exhibit improved adhesion to various resin matrixes, which adhesion does not depend upon the particular resin matrix used.

Another object is to provide a resinous composition for use in surface-treating reinforcing carbon fibers, which composition possesses good dispersibility in water and functions as a sizing agent. The resinous composition is advantageous not only from standpoints of hygiene and safety in work operations but also in that fluffing of the carbon fibers does not occur in the course of forming a composite material even without the use of a sizing agent such as polyvinyl alcohol.

Still another object is to provide a carbon fiber reinforced composite material of improved mechanical properties.

Other objects and advantages of the present invention will be apparent from the following description.

The resinous composition of the present invention comprises (A) an epoxy resin, (B) a condensation product of an acid component comprising an unsaturated dibasic acid and a hydroxyl component comprising an oxyalkylated bisphenol, and (C) an oxyalkylene derivative of a phenol.

(A) Epoxy resin

The type of the epoxy resin, i.e., component (A) in the resinous composition of the present invention is not critical provided that the epoxy resin is capable of enhancing the adhesion of the reinforcing fibers to resin matrixes. Most conventional epoxy resins may be used. Suitable epoxy resins include, for example, the following four group glycidyl-type epoxy resins and non-glycidyl-type epoxy resins.

(1) Bisphenol-type epoxy resins prepared by the condensation of bisphenols such as bisphenol A, bisphenol F, 2,2'-bis(4-hydroxyphenyl)butane, and 2,2'-bis(4-hydroxyphenyl)hexafluoropropane, with epichlorohydrin. Such bisphenol-type epoxy resins include, for example, commercially available "Epikote 828", "Epikote 834" and "Epikote 1001" (all supplied by Shell Chemical Co.).

(2) Phenol-type epoxy resins prepared by, for example, reacting a novolak type phenol resin with epichlorohydrin. Such phenol-type epoxy resins include a commercially available "Epikote 154" (Supplied by Shell Chemical Co.).

(3) Ester-type epoxy resins prepared by, for example, copolymerizing ethylenically unsaturated compounds such as acrylonitrile, styrene, vinyl acetate and vinyl chloride, with glycidyl methacrylate.

(4) Ether-type epoxy resins prepared by, for example, reacting polyol or polyetherpolyol with epichlorohydrin.

As non-glycidyl-type epoxy resins, cyclic aliphatic epoxy resin, epoxidized polybutadiene and epoxidized soybean oil may be used.

The above-listed epoxy resins may be used either alone or in combination. Among the above-listed epoxy resins, glycidyl-type epoxy resins such as the bisphenol-type epoxy resins in item (1), above, and the phenol-type epoxy resins in item (2) above, are preferable. More preferable are those which have an average molecular weight of approximately 200 to approximately 4,000, particularly approximately 300 to approximately 1,000.

(B) Condensation product of an acid component and a hydroxyl component

Oxyalkylated bisphenols used as the hydroxyl component for the preparation of the condensation product (B) in the resinous composition of the present invention, are expressed by the following formula (1).

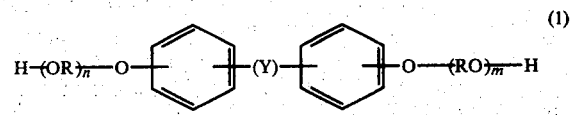
(1)

where n+m is an integer of from 1 to 100, Y is an alkylene group having 1 to 5 carbon atoms or a fluoro-substituted alkylene group having 1 to 5 carbon atoms, and R is an alkylene group having 2 to 4 carbon atoms. Such oxyalkylated bisphenols may be prepared by the addition reaction of an alkylene oxide to a bisphenol. The bisphenol used includes, for example, bisphenol A, bisphenol F, 2,2'-bis(4-hydroxyphenyl)butane and 2,2'-bis(4-hydroxyphenyl)hexafluoropropane. Among these, bisphenol A is preferable. The alkylene oxide includes, for example, alkylene oxides having 2 to 4 carbon atoms such as ethylene oxide (EO), propylene oxide (PO), butylene oxide (BO), and a random or block copolymer derived from at least two of these alkylene oxides.

In the preparation of the above-mentioned oxyalkylated bisphenols, alkylene oxides may be used either alone or in combination. The amounts of the alkylene oxides to be added to bisphenols are such that their mole number per mole of bisphenol is usually 1 to 100, preferably 1 to 20 and more preferably 1 to 5. When the mole number of the alkylene oxide is smaller than 1, the subsequent condensation reaction with acid components does not proceed smoothly. In contrast, when the mole number exceeds 100, the resulting condensation product is somewhat poor in adhesion.

The hydroxyl component may be comprised of, in addition to the above-mentioned oxyalkylated bisphenols, other hydroxyl components such as polyhydric alcohol, for example, glycol or polyether glycol, and monohydric alcohol, provided that the amount of such other hydroxyl components is such that said hydroxyl components do not exert a baneful influence upon the adhesion of the reinforcing fibers to resin matrixes. However, it is preferable that the proportions of the polyhydric alcohol and the monohydric alcohol to the total amounts of the hydroxyl components be below 20% by weight and below 5% by weight, respectively, in view of the enhanced dispersibility in water of the resulting condensation product (B).

As the acid component used for the preparation of the condensation product (B), unsaturated dibasic acids are preferable such as fumaric acid, maleic acid, itaconic acid and citraconic acid. Particularly, fumaric acid and maleic acid are more preferable. These unsaturated dibasic acids may be used alone or in combination. In addition to these unsaturated dibasic acids, one or more of the following acids may be used; saturated dibasic acids such as adipic acid, sebacic acid and succinic acid, aromatic dibasic acids such as terephthalic acid, isophthalic acid and orthophthalic acid, and aliphatic monobasic acids having 1 to 22 carbon atoms. However, the amount of the saturated dibasic acids or the aromatic dibasic acids should preferably not be larger than 20% by weight base on the total weight of the acid component, and the amount of the monobasic acids should preferably not be larger than 5% based on the total weight of the acid component. When the amount of the saturated dibasic acids or the aromatic dibasic acids exceeds 20% by weight, the resulting resinous composition becomes poor in adhesion to a resin matrix. When the amount of the monobasic acid exceeds 5% by weight, the resulting resinous composition becomes poor in adhesion to a resin matrix and exhibits an undesirably low softening point.

Condensation of the acid component and the hydroxyl component for the preparation of condensation product (B) may be carried out by a conventional esterification procedure. The acid component used may be in any form of anhydride, lower alkyl ester and acid halide as well as free acid. The molar ratio of the acid component (a) to the hydroxyl component (b) is (a) 0.8 to 1.2: (b) 1.2 to 0.8. A substantially equimolar ratio is optimum. The condensation product preferably possesses a softening point of 30° to 150° C., more preferably approximately 40° to 80° C. and an average molecular weight of 800 to 50,000, more preferably approximately 1,000 to 5,000. When the softening point and the average molecular weight are outside the above-mentioned ranges, the resulting resinous composition is liable to exhibit poor adhesion and poor dispersibility in water.

(c) Oxyalkylene derivative of a phenol

As the phenols used, those which are expressed by the following formula (2) and those which are prepared by reacting the phenols of the formula (2) with styrene or a substituted styrenes such as (α-methylstyrene are preferable.

$$Ar\text{-}(OH)_p \qquad (2)$$

where p is an integer of 1 to 3, and Ar is benzene or naphthalene nucleus, or a benzene or naphthalene nucleus with at least one hydrogen atom thereof substituted with at least one group selected from an alkyl group having 1 to 15 carbon atoms,

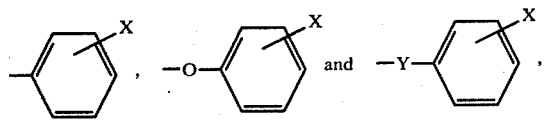

where X is hydrogen, a hydroxyl group or an alkyl group having 1 to 15 carbon atoms, and Y is an alkylene group having 1 to 5 carbon atoms or a fluoro-substituted alkylene group having 1 to 5 carbon atoms. The phenols expressed by the formula (2) include, for example, single phenols such as phenol, alkylphenols and polyhydric phenol, and poly-ring phenols such as phenylphenol, cumylphenol, benzylphenol, hydroquinone monophenyl ether, naphthol, and bisphenol.

The phenols prepared by reacting the phenols of the formula (2) with styrene or a substituted styrene (such phenols are hereinafter referred to "styrenated phenols" for brevity) are derived from usually about 1 to 20 moles, preferably 1 to 10 moles, of styrene or a substituted styrene and 1 mole of the phenol of the formula (2).

In view of the emulsion stability of the resinous composition and the compatibility of the component (C) with the components (A) and (B), the styrenated phenols are preferable as compared with the phenols of the formula (2).

Alkylene oxides used for the preparation of the component (C) include, for example, those having 2 to 4 carbon atoms such as ethylene oxide, propylene oxide and butylene oxide and a random or block copolymer derived from at least two of these alkylene oxides. Of these, ethylene oxide and a random copolymer of ethylene oxide and propylene oxide are preferable.

The oxyalkylated derivatives of phenols, i.e., component (C), may be prepared by a conventional addition reaction of alkylene oxides to phenols. However, the oxyalkylene derivatives of styrenated phenols may be prepared either by reacting simultaneously (a) phenols, (b) styrene or substituted styrenes and (c) alkylene oxides, or by reacting first (a) with one of (b) and (c) and then reacting the reaction product with the other of (b) and (c). The mole number of alkylene oxides is 1 to 120, preferably 10 to 90 and more preferably 30 to 80, per mole of phenols. When the mole number of alkylene oxides is smaller than 1, the component (C) is poor in the emulsifying function. In contrast, when said mole number is larger than 120, the resulting resinous composition is poor in the emulsion stability.

The proportion of the three components (A), (B) and (C) in the resinous composition of the present invention is such that the ratio by weight of (A):(B) is usually 10 to 90:90 to 10, preferably 30 to 70:70 to 30. When the ratio of (A):(B) is within this range, the adhesion of the resulting surface-treated reinforcing fibers to resin matrixes does not tend to vary depending upon the particular resin matrix used. The amount of (C) is usually 5 to 30% by weight, preferably 8 to 25% by weight and more preferably 15 to 25% by weight, based on the total weight of (A) and (B), in view of enhanced compatibility of the three components (A), (B) and (C). The resinous composition with below 5% by weight of (C) is poor in uniformity because of reduced compatibility of the three components (A), (B) and (C). In contrast, the resinous composition with larger than 30% by weight of (C) tends to exhibit poor adhesion to the resin matrix.

The resinous composition of the present invention comprising the above-mentioned three components (A), (B) and (C) has good dispersibility in water and gives reinforcing fibers improved adhesion to resin matrixes. Reinforcing fibers, to which the resinous composition of the present invention is applied, include, for example, inorganic fibers such as carbon fibers, glass fibers, silicon carbide fibers, whiskers, asbestos and rock wools, and high tenacity organic synthetic polymer fibers, for example, polyamide fibers such as nylon-6, nylon-66 and polyaramide fibers (such as "Kevlar" supplied by E. I. Du Pont), and polyethyleneterephthalate fibers. It is especially preferable that the resinous composition is applied to carbon fibers, particularly carbon fiber which has been previously surface oxidation-treated. The surface oxidation treatment may be effected by a liquid phase oxidation procedure wherein a solution of an oxidizing compound such as nitric acid, chromic acid or a permanganate is employed, by a gaseous phase oxidation procedure wherein ozone, air or other oxygen-containing gas is employed, or by an electrolytic oxidation procedure wherein carbon fibers are subjected to anodic oxidation. Of these procedures, an electrolytic oxidation procedures is preferable in view of easiness in work operations and uniformity in the oxidizing effect over the entire surfaces.

The resinous composition of the present invention is usually applied in the form of a dispersion or emulsion in water to reinforcing fibers. The aqueous dispersion or emulsion may be prepared by conventional aqueous dispersion or emulsion preparing procedures. For example, the three components (A), (B) and (C) are added in optional order to water, and then the mixture is emulsified, if desired, while being heated. Or, the two components (B) and (C) are added to water and the mixture is emulsified, if desired while being heated, and then, the component (A) in an emulsion form prepared by emulsion polymerization is added to the emulsified mixture. It is convenient that the aqueous dispersion or emulsion possess a solid concentration of about 30% to about 70% by weight. When the aqueous dispersion or emulsion is applied to reinforcing fibers, it may be diluted, for example, into a solid concentration of about 0.5 to 10% by weight.

The method by and the conditions under which the aqueous dispersion or emulsion is applied to reinforcing fibers are not critical, but may suitably be chosen depending upon the particular type and form of reinforcing fibers. When the resinous composition is applied to carbon fibers, the amount of the resinous composition deposited onto the carbon fiber is preferably about 0.01 to 10% by weight, more preferably about 0.1 to 5% by weight, from the point of view of prevention of fluffing and superiority in handling. That is, when the amount of the resinous composition deposited is smaller than about 0.01% by weight, the adhesion to resin matrix is not sufficient for giving the composite materials good mechanical properties, although the adhesion varies depending upon the particular resin matrix used. Furthermore, the bundle of the carbon filaments tends to fluff in the course of manufacturing composite materials therefrom, resulting in difficulty in handling. In contrast, when said amount exceeds about 10%, the composite materials obtained do not have satisfactory mechanical properties.

Depending upon the total denier, filament number and form of the carbon filaments or tow, a conventional sizing treatment can be omitted wherein a sizing agent such as polyvinyl alcohol is employed for the purpose of preventing the carbon filaments from fluffing and making them easy to handle in the step of shaping them into a composite material. This is because such purpose is achieved by the resinous composition of the present invention. However, such conventional sizing treatment may be used, if desired.

The carbon fibers surface-treated with the resinous composition of the present invention may be shaped into a composite material by a known procedure. For example, there may be employ: (1) a filament winding procedure; (2) a prepreg-laminating procedure wherein the carbon filaments are disposed in one or more directions so that they form a sheet, or a knitted or woven fabric from the carbon filaments are impregnated with a resin matrix to obtain a prepeg, and then, two or more prepegs are laminated and pressed, and; (3) a molding procedure wherein cut fibers of the carbon filaments or tow are mixed with a resin matrix and the mixture is injection molded.

The advantages of the resinous composition of the present invention are summarized as follows.

(1) The carbon filaments treated with the resinous composition do not fluff in the step of shaping them into a composite material and are easy to handle. Thus, the shaping of a composite material can be carried out without any trouble.

(2) As the treated carbon filaments exhibit good compatibility with various resin mixtures and improved adhesion to the resin matrixes, the resulting composite material possesses improved and uniform mechanical properties (tensile strength, interlaminar shear strength, bending strength and the like).

(3) The adhesion of the treated carbon filaments or tow to the resin matrixes varies only to a slight extent depending upon the particular resin matrix. Particularly, the adhesions to the following resin matrixes are approximately the same; epoxy resin, unsaturated polyester resin, phenolic resin, polybutylene terephthalate resin, polyimide resin and polyurethane. It is particularly to be noted that the adhesions to epoxy resin and to unsaturated polyester resin are approximately the same, although the adhesions of untreated carbon filaments to epoxy resin and unsaturated polyester resin are completely different. Due to this advantage, it is possible to employ as the resin matrix not only a single resin, but also a mixture of two or more resins, and thus, the variety of composite materials is broadened.

The method by and the conditions under which reinforcing fibers are treated with the resinous composition of the present invention and the method of shaping the treated reinforcing fibers into a composite material are hereinbefore illustrated in detail with reference to carbon fibers. However, it will be understood that the above-illustrated methods and conditions may be employed for other reinforcing fibers in a similar manner or with a slight modification.

The invention is further illustrated, in detail with reference to the examples and comparative examples, set forth below, wherein parts and percents are by weight unless otherwise specified.

The bending strength and the interlaminar shear strength were determined as follows.

Test specimen: a unidirectionally reinforced composite material was prepared by a molding procedure in Examples 1 and 3 and Comparative Examples 1, 2 and 3, and by a prepreg sheet-laminating procedure in Examples 2 and 4. The size was 2.5 mm in thickness and 6 mm in width.

Measuring method: the ratio of the span to the thickness was 32 and 5.8 for the bending strength and the interlaminar shear strength, respectively. The crosshead speed was 1.25 mm/minute.

EXAMPLE 1

(a) Epikote 828 (supplied by Shell Chemical Co.):30 parts
(b) Condensation product of (i) 2 moles of an addition product of 2 moles ethylene oxide to one mole bisphenol A, (ii) 1.5 moles of maleic acid and (iii) 0.5 mole of sebacic acid, having an acid value of 55:20 parts
(c) Polyoxyethylene (70 moles) styrenated (5 moles) cumylphenol: 5 parts
(d) Water: 45 parts A hgh viscosity emulsifier apparatus was charged with the above-mentioned ingredients (a), (b) and (c), followed by heating at a temperature of 50° to 60° C. Ten percent of the above-mentioned ingredient (d) was added to the uniform mixture so prepared, and the mixture was well stirred at a temperature below 40° C., thereby to be converted into an emulsion. The remaining part of ingredient (d) was gradually added to the emulsion to obtain a uniform, white emulsion having a viscosity of 200 cps and a solids concentration of 55%. A bundle of 6,000 carbon filaments previously electrolytically surface oxidation-treated by a conventional procedure was treated with the above-mentioned emulsion. That is, the carbon filament bundle was passed through a bath of the emulsion, which was previously diluted with water to a 3.5% solid concentration, and then, the carbon filament bundle was passed through a heated zone maintained at a temperature of 150° to 160° C. for a period of several minutes to be thereby dried. The carbon filament bundle so treated contained 1.2% of the above-mentioned treating agent based on the weight of the solid content.

Using separately the four types of synthetic resins shown in the footnote of Table I, below, carbon fiber reinforced plastics (hereinafter referred to as "CFRP" for brevity), each having a carbon fiber content of 60% by volume, were made from the surface-treated carbon filament bundle. The mechanical properties of the CFRPs are shown in Table I, below.

Table I

| Matrix resin *1 | Invention | | Comparative examples *2 | | | |
|---|---|---|---|---|---|---|
| | | | 1 | | 2 | |
| | Bending strength (kg/mm²) | Interlaminar shear strength (kg/mm²) | Bending strength (kg/mm²) | Interlaminar shear strength (kg/mm²) | Bending strength (kg/mm²) | Interlaminar shear strength (kg/mm²) |
| A | 156.4 | 7.7 | 151.3 | 6.7 | 149.5 | 6.5 |
| B | 155.3 | 7.5 | 151.1 | 6.6 | 148.7 | 6.5 |
| C | 158.8 | 7.7 | 120.1 | 5.2 | 120.6 | 5.2 |
| D | 126.8 | 5.8 | 120.2 | 5.1 | 118.5 | 4.9 |

*1 A: Epikote 828 (supplied by Shell Chemical Co.) 100 parts/BF₃ mono ethyl amine 5 parts
B: Epikote 827 (supplied by Shell Chemical Co.) 100 parts/nodic methyl 90 parts/2-ethyl-4-methylimidazole 1 part
C: polymal 8225 P (an unsaturated polyester resin supplied by Takeda Pharmaceutical Co.) 100 parts/methyl ethyl ketone peroxide 1 part
D: BLL 3085 (a phenolic resin supplied by Showa Union Gosei Co.) 100 parts/Versamide (a polyamide supplied by Dai-ichi General Co.) 10 parts
*2 Comparative examples
1: CFRP made from a carbon filament bundle, which was similar to that used in the above-mentioned Example, but contained 0.8% of ingredient (a) instead of ingredients (a), (b) and (c).
2: CFRP made from a carbon filament bundle, which was similar to that used in the above-mentioned Example, but not treated with the emulsion of ingredients (a), (b), (c) and (d).

EXAMPLE 2

(a) Epikote 154 (supplied by Shell Chemical Co.):20 parts
(b) Condensation product of (i) 1.8 moles of an addition product of 2 moles propylene oxide to one mole bisphenol A, (ii) 0.2 mole of propylene glycol, (iii) 1.0 mole of maleic acid and (iv) 1.0 mole of phthalic anhydride, having an acid value of 80:15 parts
(c) Condensation product of (i) 1.5 moles of an addition product of 2 moles ethylene oxide to one mole bisphenol A, (ii) 0.5 mole of diethylene glycol, (iii) 1.5 moles of fumaric acid and (iv) 0.5 mole of adipic acid, having an acid value of 50:15 parts
(d) Polyoxyethylene (30 moles) polyoxypropylene (10 moles) styrenated (5 moles) phenol:10 parts
(e) Water:40 parts A uniform, white emulsion having a viscosity of 580 cps and a solid concentration of 60% was prepared from the above-mentioned ingredients in a manner similar to that set forth in Example 1.

A bundle of 3,000 carbon filaments previously electrolytically surface oxidation-treated by a conventional procedure was treated with the above-mentioned emulsion. That is, the carbon filament bundle was continuously brought into contact with part of the periphery of a roller, another part of which was placed in a bath of the emulsion which was previously diluted with water to a 2.0% solid concentration. Then, the treated carbon filament bundle was passed through a heated zone maintained at 150° to 160° C. for a period of several tens of seconds to be thereby dried. The dried carbon filament bundle contained 0.9% of the above-mentioned treating agent based on the weight of the solid content.

The dried carbon filament bundle was impregnated with a solution in methyl ethyl ketone of a mixture of Epikote 828, 100 parts/BF$_3$ mono ethyl amine 5 parts. About one hundred carbon filament bundles were arranged in parallel so that they form a flat sheet and, then, heated to evaporate the methyl ethyl ketone, whereby a uniform prepreg sheet containing about 50% of carbon filaments was obtained.

A plurality of the prepreg sheets were laminated by a hot press forming procedure to obtain a flat, unidirectionally reinforced composite sheet. The reinforced composite sheet had a bending strength of 160.2 kg/mm$^2$ and an interlaminar shear strength of 8.0 kg/mm$^2$.

For comparison purposes, a flat, unidirectionally reinforced composite sheet was made by the procedure set forth in the above example 2, except that the carbon filament bundle was not treated with the emulsion of ingredients (a) through (e). The reinforced composite sheet had a bending strength of 150.0 kg/mm$^2$ and 6.5 kg/mm$^2$.

EXAMPLE 3

Following a procedure similar to that set forth in Example 2, a bundle of 3,000 carbon filaments was treated with the treating agent of ingredients (a) through (c) to obtain a carbon filament bundle containing 0.9% of the treating agent based on the weight of the solid content. Then, CFRPs were made from the carbon filament bundle by a procedure similar to that set forth in Example 2, except that an unsaturated polyester resin was used as matrix instead of the epoxy resin. The CFRPs contained 60% by volume of the carbon filament. The mechanical properties of the CFRPs were shown in Table II, below.

(c) Condensation product of (i) one mole of a random addition product of 2 moles ethylene oxide and 2 moles propylene oxide to one mole bisphenol, with (ii) one mole of maleic acid, having an acid value of 50:10 parts (d) Polyoxyethylene (50 moles) styrenated (5 moles)-orthophenylphenol:4 parts (e) Water:36 parts A high viscosity emulsifier apparatus was charged with the above-mentioned ingredients (b), (c) and (d), followed by heating at a temperature of 50° to 60° C. Ten percent of the above-mentioned ingredient (e) were added to the uniform mixture so prepared, and the mixture was well stirred at a temperature below 40° C., thereby to be converted into an emulsion. The remaining part of ingredient (e) was gradually added to the emulsion and furthermore ingredient (a) was added thereto to obtain a uniform, white emulsion having a viscosity of 150 cps and a solid concentration of 40%.

A tow comprised of 200,000 carbon filaments previously electrolytically surface oxidation-treated by a conventional procedure was treated with the above-mentioned emulsion as follows. The emulsion was diluted with water to a 5.5% solid concentration. The carbon filament tow was sprayed on both sides thereof with the diluted emulsion and, then, passed through nip rollers having a suitably adjusted nip. Then, the carbon filament tow was passed through a heated zone maintained at a temperature of 150° to 160° C. for several minutes to be thereby dried. The treated tow exhibited scattering in the concentration of the treating agent to a slight extent, but the average solid concentration of the treating agent was approximately 2.1%.

The treated carbon filament tow was impregnated with an unsaturated polyester resin preparation com- Table II

| Matrix resin *1 | Boiling water treatment *2 | Invention | | Comparative examples *3 | | | |
|---|---|---|---|---|---|---|---|
| | | | | 1 | | 2 | |
| | | Bending strength (kg/mm$^2$) | Interlaminar Shear strength (kg/mm$^2$) | Bending strength (kg/mm$^2$) | Interlaminar shear strength (kg/mm$^2$) | Bending strength (kg/mm$^2$) | Interlaminar shear strength (kg/mm$^2$) |
| A | Before | 158.9 | 7.5 | 122.2 | 5.1 | 121.0 | 5.0 |
| | After | 140.2 | 6.4 | 97.1 | 3.8 | 96.6 | 3.8 |
| B | Before | 165.2 | 7.8 | 125.7 | 5.1 | 126.1 | 5.1 |
| | After | 146.1 | 6.2 | 101.4 | 4.0 | 98.9 | 3.7 |

*1 A: Polymal 8225 P (supplied by Takeda Pharmaceutical Co.) 100 parts/methyl ethyl ketone peroxide 1 part B: ESTER R 280 (an unsaturated polyester resin supplied by Mitsui-toatsu Co.) 100 parts/benzoyl peroxide 1 part/ dimethyl aniline 0.1 part

*2 Mechanical properties were determined before and after the specimen was immersed in boiling water at 98° to 100° C. for 6 hours

*3 Comparative examples

1: CFRP made from a carbon filament bundle, which was similar to that used in the above-mentioned Example 3, but contained 0.6% of ingredient (a) instead of ingredients (a) through (d)

2: CFRP made from a carbon filament bundle, which was similar to that used in the above-mentioned Example 3, but not treated with the emulsion of ingredients (a) through (e)

EXAMPLE 4

(a) A uniform polymer emulsion having a solid concentration of 35% prepared by polymerizing a mixture of one mole of glycidyl methacrylate and 3 moles of butyl acrylate by a conventional emulsion polymerization procedure:40 parts (b) Epikote 828 (supplied by Shell Chemical Co.):10 parts prised of 100 parts of Polymal 8225 P and one part of methyl ethyl ketone peroxide to obtain a prepreg sheet. Immediately thereafter, a plurality of the prepreg sheets were laminated by using a hot press to form a flat, unidirectionally reinforced composite sheet containing 60% by volume of the carbon filaments. The reinforced composite sheet had the mechanical properties shown in Table III, below.

Table III

| Boiling water treatment *1 | Invention | | Comparative examples *2 | | | |
|---|---|---|---|---|---|---|
| | | | 1 | | 2 | |
| | Bending strength (kg/mm$^2$) | Interlaminar shear strength (kg/mm$^2$) | Bending strength (kg/mm$^2$) | Interlaminar shear strength (kg/mm$^2$) | Bending strength (kg/mm$^2$) | Interlaminar shear strength (kg/mm$^2$) |
| Before | 156.6 | 7.3 | 126.7 | 5.5 | 118.5 | 5.0 |
| After | 141.8 | 6.1 | 101.2 | 3.9 | 95.8 | 3.6 |

*1 Same as set forth in the footnote of Table II
*2 Comparative examples
1: CFRP made from a carbon filament tow, which was similar to that used in the above-mentioned example 4, but contained 1.5% of a 4:1 (by weight) mixture of ingredients (a) and (b) instead of ingredients (a) through (d)
2: CFRP made from a carbon filament tow, which was similar to that used in the above-mentioned example 4, but not treated with the emulsion of ingredients (a) through (e)

What we claim is:

1. A process for treating fibers which comprises applying to carbon fibers an aqueous dispersion of the following components (A), (B) and (C):
   (A) an epoxy resin;
   (B) a condensation product of an acid component comprising an unsaturated dibasic acid and a hydroxyl component comprising an oxyalkylated bisphenol, and;
   (C) an oxyalkylene derivative of a phenol.

2. The process of claim 1, wherein the amount of (A), (B) and (C) applied onto the carbon fibers is 0.01 to 10% by weight based on the weight of the fibers.

3. The process of claim 2, wherein the amount of (A), (B) and (C) applied onto the carbon fibers is 0.1 to 0.5% by weight based on the weight of the fibers.

4. The process of claim 2, wherein said carbon fibers are surface-oxidized carbon fibers.

5. The process of claim 4, wherein said surface-oxidized carbon fibers are those obtained by electrolytic oxidation.

6. Carbon fibers applied with a resin composition, which comprises:
   (A) an epoxy resin,
   (B) a condensation product of an acid component comprising an unsaturated dibasic acid and a hydroxyl component comprising an oxyalkylated bisphenol, and;
   (C) an oxyalkylene derivative of a phenol.

7. A carbon fiber-reinforced composite material which comprises at least one resin matrix and the carbon fibers applied with a composition, comprising
   (A) an epoxy resin,
   (B) a condensation product of an acid component comprising an unsaturated dibasic acid and a hydroxyl component comprising an oxyalkylated bisphenol and;
   (C) an oxyalkylene derivative of a phenol.

8. The carbon fiber-reinforced composite of claim 7, wherein said resin matrix is at least one resin selected from the group consisting of an epoxy resin, an unsaturated polyester resin and a phenolic resin.